(12) United States Patent
Abotabl et al.

(10) Patent No.: US 12,531,713 B2
(45) Date of Patent: Jan. 20, 2026

(54) SEMI-PERSISTENT SCHEDULING AND CONFIGURED GRANT ACTIVATION USING A DUPLEXING PARAMETER

(71) Applicant: QUALCOMM Incorporated, San Diego, CA (US)

(72) Inventors: Ahmed Attia Abotabl, San Diego, CA (US); Abdelrahman Mohamed Ahmed Mohamed Ibrahim, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 652 days.

(21) Appl. No.: 17/929,137

(22) Filed: Sep. 1, 2022

(65) Prior Publication Data

US 2024/0080171 A1    Mar. 7, 2024

(51) Int. Cl.
*H04L 5/14*     (2006.01)
*H04L 5/00*     (2006.01)
*H04W 72/23*    (2023.01)

(52) U.S. Cl.
CPC .............. *H04L 5/14* (2013.01); *H04L 5/0098* (2013.01); *H04W 72/23* (2023.01)

(58) Field of Classification Search
CPC ......... H04L 5/14; H04L 5/0098; H04W 72/23
See application file for complete search history.

(56) References Cited

U.S. PATENT DOCUMENTS

2023/0014238 A1*    1/2023    Pocovi .............. H04W 72/0446

OTHER PUBLICATIONS

International Search Report and Written Opinion—PCT/US2023/073005—ISA/EPO—Nov. 21, 2023.
VIVO: "Discussion on Subband Non-Overlapping Full Duplex", 3GPP TSG RAN WG1 #110, R1-2206039, 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 12, 2022, pp. 1-9, XP052273972, Paragraph [Section 3.2].

* cited by examiner

*Primary Examiner* — Yemane Mesfin
*Assistant Examiner* — Jia Hao Deng
(74) *Attorney, Agent, or Firm* — QUALCOMM Incorporated

(57) ABSTRACT

Various aspects of the present disclosure generally relate to wireless communication. In some aspects, a user equipment (UE) may receive an indication of a duplex processing configuration associated with a scheduled grant that includes multiple occasions. The UE may process a communication associated with at least one occasion of the multiple occasions based at least in part on the duplex processing configuration. Numerous other aspects are described.

22 Claims, 11 Drawing Sheets

SEMI-PERSISTENT SCHEDULING AND CONFIGURED GRANT ACTIVATION USING A DUPLEXING PARAMETER

FIELD OF THE DISCLOSURE

Aspects of the present disclosure generally relate to wireless communication and to techniques and apparatuses for semi-persistent scheduling and configured grant activation using a duplexing parameter.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of a duplex processing configuration associated with a scheduled grant that includes multiple occasions. The method may include processing a communication associated with at least one occasion of the multiple occasions based at least in part on the duplex processing configuration.

Some aspects described herein relate to a method of wireless communication performed by a network node. The method may include transmitting a first indication of a scheduled grant that includes multiple occasions. The method may include transmitting a second indication of a duplex processing configuration associated with the scheduled grant.

Some aspects described herein relate to a method of wireless communication performed by a UE. The method may include determining a duplex processing configuration for a communication associated with an occasion of semi-persistent scheduling, the determining based at least in part on blindly detecting a duplex transmission type associated with the communication. The method may include processing the communication based at least in part on the duplex processing configuration.

Some aspects described herein relate to an apparatus for wireless communication at a UE. The apparatus may include a memory and one or more processors coupled to the memory. The one or more processors may be configured to receive an indication of a duplex processing configuration associated with a scheduled grant that includes multiple occasions. The one or more processors may be configured to process a communication associated with at least one occasion of the multiple occasions based at least in part on the duplex processing configuration.

Some aspects described herein relate to an apparatus for wireless communication at a network node. The apparatus may include a memory and one or more processors coupled to the memory. The one or more processors may be configured to transmit a first indication of a scheduled grant that includes multiple occasions. The one or more processors may be configured to transmit a second indication of a duplex processing configuration associated with the scheduled grant.

Some aspects described herein relate to an apparatus for wireless communication at a UE. The apparatus may include a memory and one or more processors coupled to the memory. The one or more processors may be configured to determine, based at least in part on a blind detection of a duplex transmission type, a duplex processing configuration for a communication associated with an occasion of semi-persistent scheduling. The one or more processors may be configured to process the communication based at least in part on the duplex processing configuration.

Some aspects described herein relate to a non-transitory computer-readable medium that stores a set of instructions for wireless communication by a UE. The set of instructions, when executed by one or more processors of the UE, may cause the UE to receive an indication of a duplex processing configuration associated with a scheduled grant that includes multiple occasions. The set of instructions, when executed by one or more processors of the UE, may cause the UE to process a communication associated with at least one occasion of the multiple occasions based at least in part on the duplex processing configuration.

Some aspects described herein relate to a non-transitory computer-readable medium that stores a set of instructions for wireless communication by a network node. The set of instructions, when executed by one or more processors of the network node, may cause the network node to transmit a first indication of a scheduled grant that includes multiple occasions. The set of instructions, when executed by one or more processors of the network node, may cause the network node to transmit a second indication of a duplex processing configuration associated with the scheduled grant.

Some aspects described herein relate to a non-transitory computer-readable medium that stores a set of instructions for wireless communication by a UE. The set of instructions, when executed by one or more processors of the UE, may cause the UE to determine, based at least in part on a blind detection of a duplex transmission type, a duplex processing configuration for a communication associated with an occasion of semi-persistent scheduling. The set of instructions, when executed by one or more processors of the UE, may cause the UE to process the communication based at least in part on the duplex processing configuration.

Some aspects described herein relate to an apparatus for wireless communication. The apparatus may include means for receiving an indication of a duplex processing configuration associated with a scheduled grant that includes multiple occasions. The apparatus may include means for processing a communication associated with at least one occasion of the multiple occasions based at least in part on the duplex processing configuration.

Some aspects described herein relate to an apparatus for wireless communication. The apparatus may include means for transmitting a first indication of a scheduled grant that includes multiple occasions. The apparatus may include means for transmitting a second indication of a duplex processing configuration associated with the scheduled grant.

Some aspects described herein relate to an apparatus for wireless communication. The apparatus may include means for determining a duplex processing configuration for a communication associated with an occasion of semi-persistent scheduling, the means for determining being based at least in part on means for blindly detecting a duplex transmission type associated with the communication. The apparatus may include means for processing the communication based at least in part on the duplex processing configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
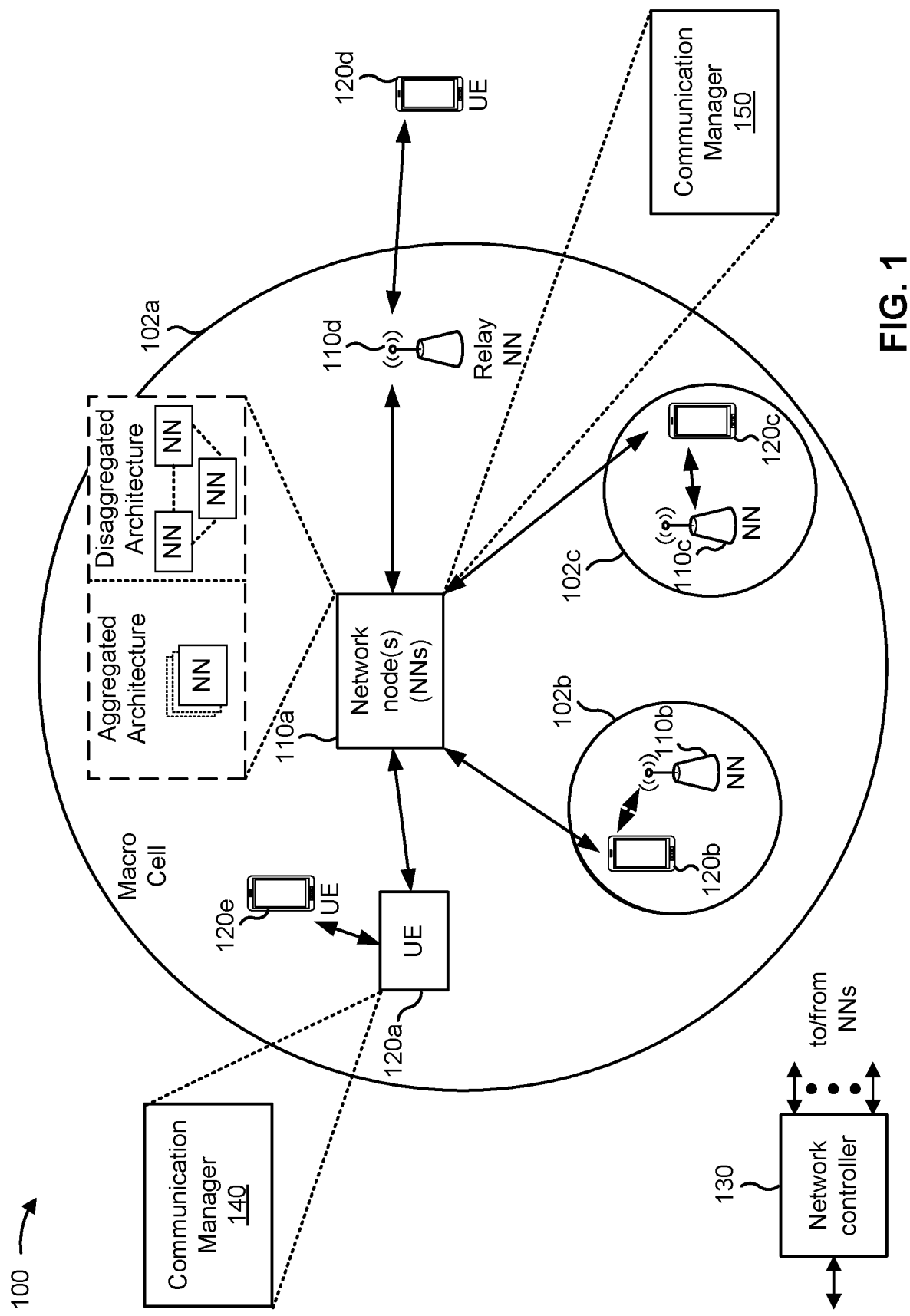
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive an indication of a duplex processing configuration associated with a scheduled grant that includes multiple occasions; and process a communication associated with at least one occasion of the multiple occasions based at least in part on the duplex processing configuration. In some aspects, the communication manager 140 may determine a duplex processing configuration for a communication associated with an occasion of semi-persistent scheduling. The communication manager 140 may determine the duplex processing configuration based at least in part on blindly detecting a duplex transmission type associated with the communication and process the communication based at least in part on the duplex processing configuration. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit a first indication of a scheduled grant that includes multiple occasions; and transmit a second indication of a duplex processing configuration associated with the scheduled grant. Additionally, or alternatively, the communication manager 150 may perform one or more other operations described herein.

As indicated above, FIG. 1 is provided as an example. Other examples may differ from what is described with regard to FIG. 1.

Figure 2:
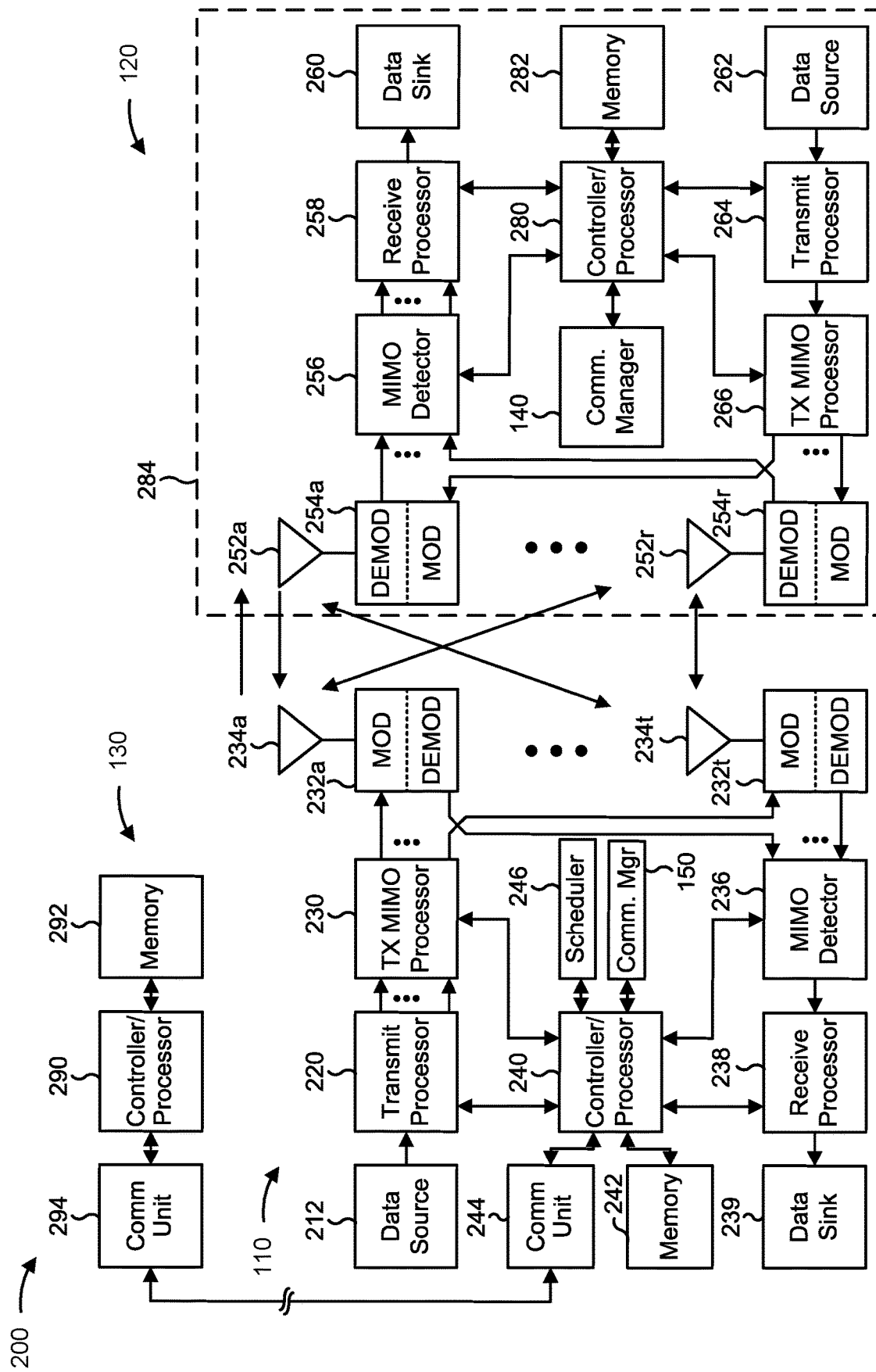
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator (DE-MOD) component of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the UE 120, and/or any other component(s) of FIG. 2 may perform one or more techniques associated with semi-persistent scheduling and configured grant activation using a duplexing parameter, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving an indication of a duplex processing configuration associated with a scheduled grant that includes multiple occasions; and/or means for processing a communication associated with at least one occasion of the multiple occasions based at least in part on the duplex processing configuration. Alternatively or additionally, the UE includes means for determining a duplex processing configuration for a communication associated with an occasion of semi-persistent scheduling, the means for determining being based at least in part on means for blindly detecting a duplex transmission type associated with the communication; and/ or means for processing the communication based at least in part on the duplex processing configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting a first indication of a scheduled grant that includes multiple occasions; and/or means for transmitting a second indication of a duplex processing configuration associated with the scheduled grant. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
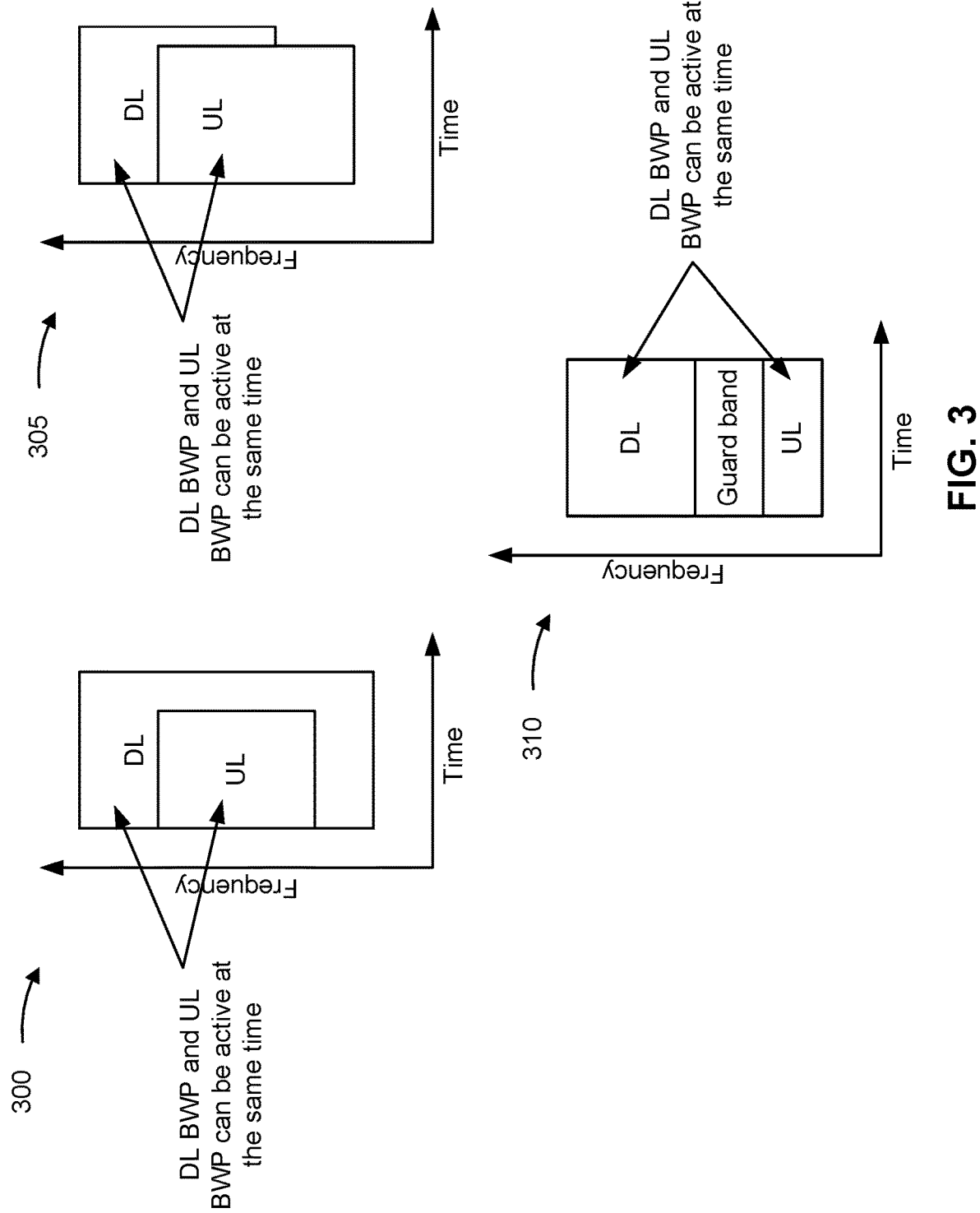
FIG. 3 is a diagram illustrating a first example, a second example, and a third example of full-duplex communication in a wireless network, in accordance with the present disclosure.

FIG. 3 is a diagram illustrating a first example 300, a second example 305, and a third example 310 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink (DL) communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 3, the first example 300 and the second example 305 show examples of in-band full-duplex (IBFD) communication. In IBFD, a UE may transmit an uplink communication to a network node and receive a downlink communication from the network node on the same time and frequency resources. As shown in the first example 300 of IBFD, the time and frequency resources for uplink communication may fully overlap with the time and frequency resources for downlink communication. As shown in the second example 305 of IBFD, the time and frequency resources for uplink communication may partially overlap with the time and frequency resources for downlink communication.

As further shown in FIG. 3, the third example 310 shows an example of sub-band full-duplex (SBFD) communication, which may also be referred to as "sub-band frequency division duplex (SBFDD)" or "flexible duplex." In SBFD, a UE may transmit an uplink communication to a network node and receive a downlink communication from the network node at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

As indicated above, FIG. 3 is provided as an example. Other examples may differ from what is described with respect to FIG. 3.

Figure 4:
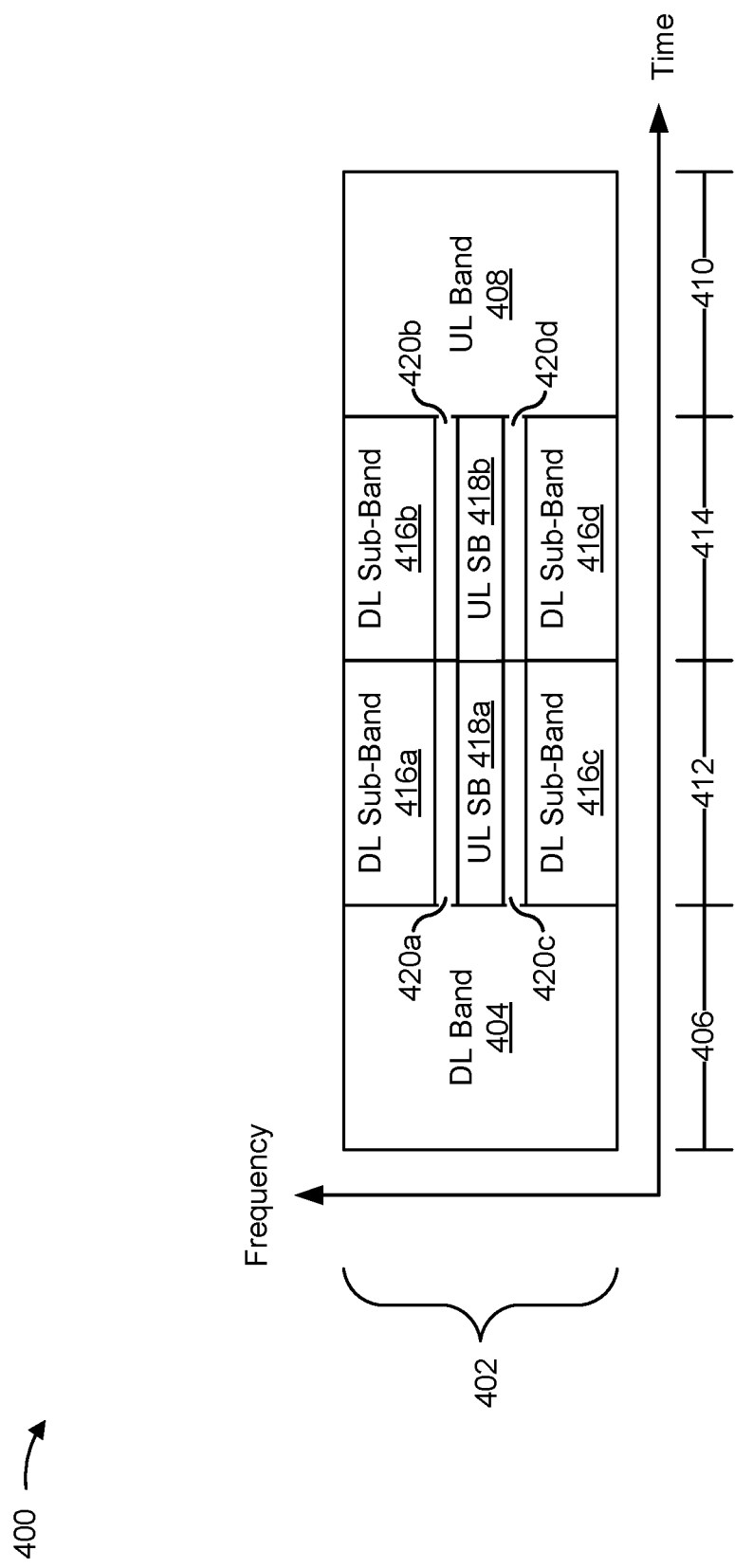
FIG. 4 is a diagram illustrating an example of a sub-band full-duplex (SBFD) format, in accordance with the present disclosure.

FIG. 4 is a diagram illustrating an example 400 of an SBFD format 402, in accordance with the present disclosure. As shown by the example 400, the SBFD format 402 may specify a slot format pattern that is based at least in part on one or more time partitions (shown on a horizontal axis) in combination with one or more frequency partitions (shown on a vertical axis). To illustrate, each time partition may correspond to a time slot (e.g., "slot") and each frequency partition may correspond to a full frequency band and/or a frequency sub-band. The slot format pattern may include any combination of one or more full band slots, one or more sub-band slots, and/or one or more guard bands. In some aspects, a network node (e.g., the network node 110) and a UE (e.g., the UE 120) may communicate with one another based at least in part on the SBFD format 402 to transmit and/or receive wireless signals.

As one example, and as shown by the SBFD format 402, an SBFD format may include a full downlink band 404 (DL band 404) positioned at a start of the slot format pattern at time duration 406 (e.g., a first slot) and a full uplink band 408 (UL band 408) positioned at an end of the slot format pattern at time duration 410 (a second slot). Other examples may position a full DL band and/or a full UL band at different time durations. At time duration 412 (e.g., a third slot) and time duration 414 (e.g., a fourth slot), the SBFD format 402 may partition the full band into one or more partial and/or sub-bands (e.g., a sub-band of a full frequency band associated with the SBFD format). The SBFD format 402 may partition the sub-bands into a same size or in varying sizes. A size of a sub-band may be based at least in part on a resource block (RB). As one example, a first sub-band may have a size of two RBs, a second sub-band may have a size of four RBs, and/or a third sub-band may have a size of eight RBs. Some aspects may limit a number of sub-bands that may be included in a bandwidth and/or a bandwidth part. As one example, a communication standard may limit a number of sub-bands to N to reduce an amount of total communication associated with reporting measurements for each sub-band, where N is an integer.

As shown by the example 400, the SBFD format 402 may specify one or more sub-bands of a same or different size to one or more downlink communications. To illustrate, the SBFD format 402 designates downlink sub-band 416a (DL sub-band 416a), downlink sub-band 416b (DL sub-band 416b), downlink sub-band 416c (DL sub-band 416c), and downlink sub-band 416d (DL sub-band 416d) to downlink communication(s). An SBFD format may also designate one or more sub-bands to one or more uplink communications, shown by the SBFD format 402 as uplink sub-band 418a (UL sub-band 418a) and uplink sub-band 418b (UL sub-band 418b). Alternatively or additionally, an SBFD format may specify one or more guard bands between a DL sub-band and a UL sub-band, such as guard band 420a, guard band 420b, guard band 420c, and/or guard band 420d as shown by the SBFD format 402.

In some aspects, the SBFD format 402 may repeat over time. For example, at the expiration of the time duration 410, the SBFD format 402 may repeat as shown by the time duration 406 (e.g., the DL band 404), the time duration 412 (e.g., the DL sub-band 416a, the DL sub-band 416c, the UL sub-band 418a, the guard band 420a, and the guard band 420c), the time duration 414 (e.g., the DL sub-band 416b, the DL sub-band 416d, the UL sub-band 418b, the guard band 420b, and the guard band 420d), and the time duration 410 (e.g., the UL band 408). Repeating the SBFD format 402 may denote that a network node (e.g., the network node 110) and a UE (e.g., the UE 120) may repeat communicating with one another based at least in part on the (repeated) SBFD format 402.

The slot format pattern shown by the SBFD format 402 may vary in other examples. As one example, the full band shown at the time duration 406 (e.g., the DL band 404) and/or at the time duration 410 (e.g., the UL band 408) may be replaced with a UL sub-band, a DL sub-band, and/or guard bands. Alternatively or additionally, the sub-bands and/or guard bands shown by the time duration 412 and/or the time duration 414 may be replaced by a full band. In some aspects, the sub-bands and/or guard bands shown by the time duration 412 and/or the time duration 414 may be replaced with a sub-band and/or a guard band that has a different size.

As indicated above, FIG. 4 is provided as an example. Other examples may differ from what is described with respect to FIG. 4.

Figure 5:
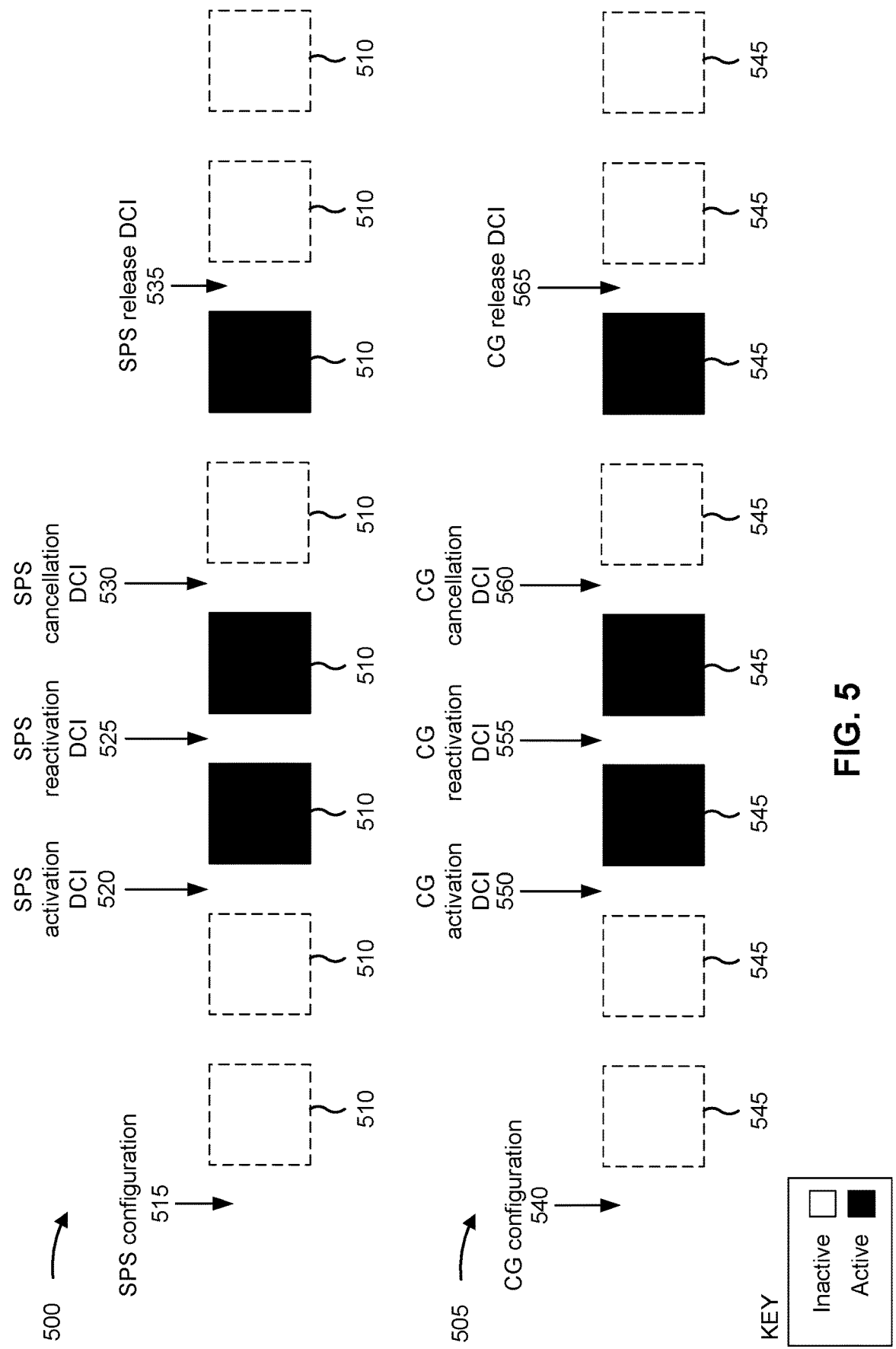
FIG. 5 is a diagram illustrating an example of downlink semi-persistent scheduling (SPS) communication and an example of an uplink configured grant (CG) communication, in accordance with the present disclosure.

FIG. 5 is a diagram illustrating an example 500 of downlink semi-persistent scheduling (SPS) communication and an example 505 of uplink configured grant (CG) communication, in accordance with the present disclosure. SPS communications may include periodic downlink communications that are configured for a UE, such that a network node does not need to transmit (e.g., directly or via one or more network nodes) separate downlink control information (DCI) to schedule each downlink communication, thereby conserving signaling overhead. CG communications may include periodic uplink communications that are configured for a UE, such that the network node does not need to transmit (e.g., directly or via one or more network nodes) separate DCI to schedule each uplink communication, thereby conserving signaling overhead.

As shown by reference number 515, a UE may be configured with an SPS configuration for SPS communications. For example, the UE may receive the SPS configuration via a radio resource control (RRC) message transmitted by a network node (e.g., directly to the UE or via one or more network nodes). The SPS configuration may indicate a resource allocation associated with SPS downlink communications (e.g., in a time domain, frequency domain, spatial domain, and/or code domain) and a periodicity at which the resource allocation is repeated, resulting in periodically reoccurring SPS occasions 510 for the UE. The SPS configuration may also configure hybrid automatic repeat request (HARD)-acknowledgement (ACK) (HARQ-ACK) feedback resources for the UE to transmit HARQ-ACK feedback for SPS physical downlink shared channel (PDSCH) communications received in the SPS occasions 510. For example, the SPS configuration may indicate a PDSCH-to-HARQ feedback timing value, which may be referred to as a K1 value in a wireless communication standard (e.g., a 3GPP standard).

The network node may transmit SPS activation DCI to the UE (e.g., directly or via one or more network nodes) to activate the SPS configuration for the UE as shown by reference number 520. The network node may indicate, in the SPS activation DCI, communication parameters, such as an MCS, an RB allocation, and/or antenna ports, for the SPS PDSCH communications to be transmitted in the scheduled SPS occasions 510. The UE may begin monitoring the SPS occasions 510 based at least in part on receiving the SPS activation DCI. For example, beginning with a next scheduled SPS occasion 510 subsequent to receiving the SPS activation DCI as shown by the reference number 520, the UE may monitor the scheduled SPS occasions 510 to decode PDSCH communications using the communication parameters indicated in the SPS activation DCI. The UE may refrain from monitoring configured SPS occasions 510 prior to receiving the SPS activation DCI.

As shown by reference number 525, the network node may transmit SPS reactivation DCI to the UE (e.g., directly or via one or more network nodes) to change the communication parameters for the SPS PDSCH communications. Based at least in part on receiving the SPS reactivation DCI, the UE may begin monitoring the scheduled SPS occasions 510 using the communication parameters indicated in the SPS reactivation DCI. For example, beginning with a next scheduled SPS occasion 510 subsequent to receiving the SPS reactivation DCI as shown by the reference number 525, the UE may monitor the scheduled SPS occasions 510 to decode PDSCH communications based on the communication parameters indicated in the SPS reactivation DCI.

In some cases, such as when there is a lack of downlink traffic to transmit to the UE, the network node may transmit SPS cancellation DCI to the UE (e.g., directly or via one or more network nodes) as shown by reference number 530 to temporarily cancel or deactivate one or more subsequent SPS occasions 510 for the UE. The SPS cancellation DCI may deactivate only a subsequent one SPS occasion 510 or a subsequent N SPS occasions 510 (where N is an integer). SPS occasions 510 after the one or more (e.g., N) SPS occasions 510 subsequent to the SPS cancellation DCI may remain activated. Based at least in part on receiving the SPS cancellation DCI, the UE may refrain from monitoring the one or more (e.g., N) SPS occasions 510 subsequent to receiving the SPS cancellation DCI as shown by the reference number 530. As shown in example 500, the SPS cancellation DCI cancels one subsequent SPS occasion 510 for the UE. After the SPS occasion 510 (or N SPS occasions)

subsequent to receiving the SPS cancellation DCI, the UE may automatically resume monitoring the scheduled SPS occasions 510.

As shown by reference number 535, the network node may transmit SPS release DCI to the UE (e.g., directly or via one or more network nodes) to deactivate the SPS configuration for the UE. The UE may stop monitoring the scheduled SPS occasions 510 based at least in part on receiving the SPS release DCI. For example, the UE may refrain from monitoring any scheduled SPS occasions 510 until another SPS activation DCI is received by the UE. Whereas the SPS cancellation DCI may deactivate only a subsequent one SPS occasion 510 or a subsequent N SPS occasions 510, the SPS release DCI deactivates all subsequent SPS occasions 510 for a given SPS configuration for the UE until the given SPS configuration is activated again by a new SPS activation DCI.

As shown by reference number 540 in the example 505, a UE may be configured with a CG configuration for CG communications. For example, the UE may receive the CG configuration via an RRC message transmitted by a network node (e.g., directly to the UE or via one or more network nodes). The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 545 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

The network node may transmit CG activation DCI to the UE (e.g., directly or via one or more network nodes) as shown by reference number 550 to activate the CG configuration for the UE. The network node may indicate, in the CG activation DCI, communication parameters, such as an MCS, an RB allocation, and/or antenna ports, for the CG physical uplink shared channel (PUSCH) communications to be transmitted in the scheduled CG occasions 545. The UE may begin transmitting in the CG occasions 545 based at least in part on receiving the CG activation DCI. For example, beginning with a next scheduled CG occasion 545 subsequent to receiving the CG activation DCI as shown by the reference number 550, the UE may transmit a PUSCH communication in the scheduled CG occasions 545 using the communication parameters indicated in the CG activation DCI. The UE may refrain from transmitting in configured CG occasions 545 prior to receiving the CG activation DCI.

As shown by reference number 555, the network node may transmit CG reactivation DCI to the UE (e.g., directly or via one or more network nodes) to change the communication parameters for the CG PUSCH communications. Based at least in part on receiving the CG reactivation DCI, the UE may begin transmitting in the scheduled CG occasions 545 using the communication parameters indicated in the CG reactivation DCI. For example, beginning with a next scheduled CG occasion 545 subsequent to receiving the CG reactivation DCI as shown by the reference number 555, the UE may transmit PUSCH communications in the scheduled CG occasions 545 based at least in part on the communication parameters indicated in the CG reactivation DCI.

In some cases, such as when the network node determines to override a scheduled CG communication for a higher priority communication, the network node may transmit CG cancellation DCI to the UE (e.g., directly or via one or more network nodes) as shown by reference number 560 to temporarily cancel or deactivate one or more subsequent CG occasions 545 for the UE. The CG cancellation DCI may deactivate only a subsequent one CG occasion 545 or a subsequent N CG occasions 545 (where N is an integer). CG occasions 545 after the one or more (e.g., N) CG occasions 545 subsequent to the CG cancellation DCI may remain activated. Based at least in part on receiving the CG cancellation DCI, the UE may refrain from transmitting in the one or more (e.g., N) CG occasions 545 subsequent to receiving the CG cancellation DCI. As shown in example 510, the CG cancellation DCI cancels one subsequent CG occasion 545 for the UE. After the CG occasion 545 (or N CG occasions) subsequent to receiving the CG cancellation DCI, the UE may automatically resume transmission in the scheduled CG occasions 545.

As shown by reference number 565, the network node may transmit CG release DCI to the UE (e.g., directly or via one or more network nodes) to deactivate the CG configuration for the UE. The UE may stop transmitting in the scheduled CG occasions 545 based at least in part on receiving the CG release DCI. For example, the UE may refrain from transmitting in any scheduled CG occasions 545 until another CG activation DCI is received by the UE. Whereas the CG cancellation DCI may deactivate only a subsequent one CG occasion 545 or a subsequent N CG occasions 545, the CG release DCI deactivates all subsequent CG occasions 545 for a given CG configuration for the UE until the given CG configuration is activated again by a new CG activation DCI.

In some aspects, a duplex configuration (e.g., full-duplex (FD) or half-duplex (HD)) associated with a scheduled grant (e.g., an SPS and/or a CG) may differ from a slot configuration. As one example, the periodicity of the scheduled grant may differ from an SBFD format repetition periodicity. To illustrate, a network node may configure a CG grant as an HD grant, but an occasion of the CG grant may occur on an FD slot. As another example, the network node may configure an SPS grant as an FD grant, but an occasion of the SPS grant may occur on an HD slot. A mismatch between a duplex configuration of a scheduled grant and a slot duplex configuration may result in the UE refraining from using the occasion. That is, the resources associated with the occasion may go unused and/or the UE 120 may wait for an occasion of the scheduled grant that occurs in a slot with a same duplex configuration, which may result in increased data transfer latencies and/or reduced data throughput. Alternatively or additionally, in some aspects, the UE 120 may apply filtering with more strict requirements than needed. To illustrate, the UE 120 may process a communication using a narrow band filter (e.g., for filtering a sub-band) based at least in part on an occasion occurring in an FD time slot (e.g., the time duration 412 and/or the time duration 414). Alternatively or additionally, the UE may process the communication using a filter designed to remove in-band signals (e.g., based at least in part on an IBFD transmission). However, the network node 110 may have information that indicates that portions of the FD time slot may go unused and/or that a complementary IBFD transmission (e.g., an in-band downlink transmission that is complementary to an in-band uplink transmission, or an in-band uplink transmission that is complementary to an in-band downlink transmission) is absent. To illustrate, the UE 120 may use a narrow band filter for transmitting an uplink communication to mitigate portions of the uplink communication that overlap with downlink portions, but downlink portions may be empty of a downlink transmission. Thus, the UE 120 may apply strict filtering that uses more energy and/or processing power in scenarios in which less strict filtering (e.g., that uses less energy and/or less processing power) could be used.

Some techniques and apparatuses described herein provide SPS and CG activation using a duplexing parameter. In some aspects, a UE may receive an indication of a duplex processing configuration associated with a scheduled grant that includes multiple occasions (e.g., an SPS and/or a CG). A "duplex processing configuration" may indicate a duplex configuration for processing a communication, where the duplex process configuration may be different from a slot configuration (e.g., an FD slot or an HD slot). For example, the duplex processing configuration may indicate an FD processing configuration or an HD processing configuration independently of a slot duplex configuration. The UE may subsequently process a communication associated with a first occasion of the multiple occasions based at least in part on the duplex processing configuration. To illustrate, the UE may transmit an uplink communication based at least in part on processing the uplink communication as an HD transmission or an FD transmission as indicated by the duplex processing configuration. Alternatively or additionally, the UE may receive a downlink communication based at least in part on processing the downlink communication as an HD transmission or an FD transmission.

In some aspects, a network node may transmit a first indication of a scheduled grant that includes multiple occasions. Alternatively or additionally, the network node may transmit a second indication of a duplex processing configuration associated with the scheduled grant.

By indicating a duplex processing configuration, a network node may instruct a UE on how to process a communication that is based at least in part on a mismatched duplex configuration and slot duplex configuration, such as a communication that is associated with an occasion of a scheduled grant. Alternatively or additionally, the network node may instruct the UE to process the communication based at least in part on using a processing configuration (e.g., a filter bandwidth) that uses less processing power and/or consumes less energy. The UE may subsequently process the communication instead of refraining from using the associated air interface resources. By processing the communication, instead of waiting for an occasion that occurs on a time slot with a same duplex configuration, the UE may decrease data transfer latencies and improve data throughput. In some aspects, the UE may reduce energy consumption and/or processing power at the UE by filtering the communication based at least in part on a filter with less strict requirements relative to a narrow band filter associated with sub-band FD communications.

As indicated above, FIG. 5 is provided as an example. Other examples may differ from what is described with respect to FIG. 5.

Figure 6:
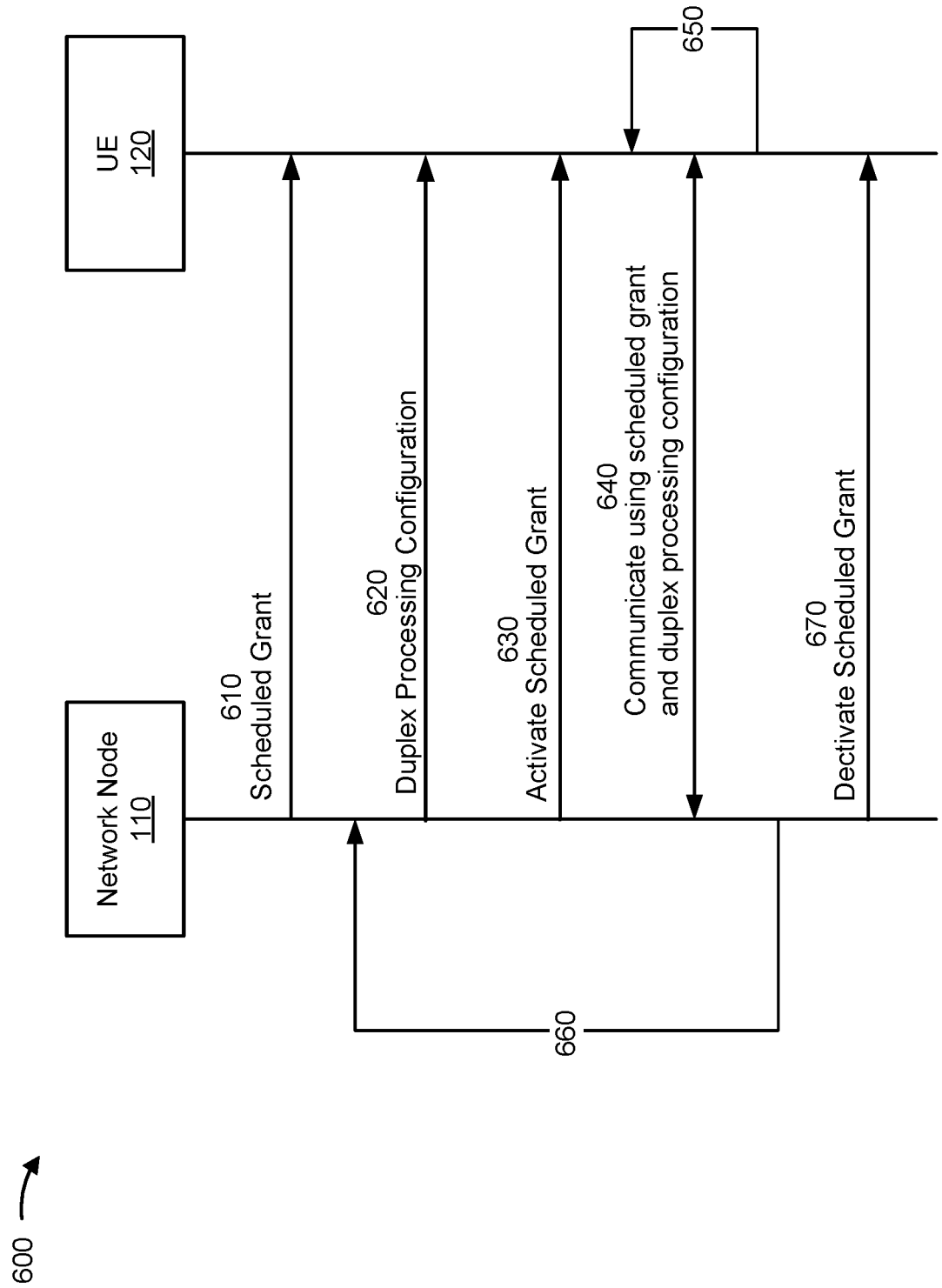
FIG. 6 is a diagram illustrating an example of a wireless communication process between a network node and a UE, in accordance with the present disclosure.

FIG. 6 is a diagram illustrating an example 600 of a wireless communication process between a network node (e.g., the network node 110) and a UE (e.g., the UE 120), in accordance with the present disclosure.

As shown by reference number 610, a network node 110 may transmit, and a UE 120 may receive, an indication of a scheduled grant (and/or a configuration of a scheduled grant) that includes multiple occasions. As one example, the network node 110 may transmit an indication of an SPS grant associated with the UE 120 receiving one or more downlink communications. As another example, the network node may transmit an indication of a CG associated with the UE 120 transmitting one or more uplink communications.

In some aspects, the network node 110 may transmit the indication of the scheduled grant based at least in part on an RRC message. To illustrate, the network node 110 may transmit, in the RRC message, a configuration of the scheduled grant and separately activate and/or deactivate the scheduled grant based at least in part on DCI as further described above. In some aspects, the network node may include, in the RRC message, an indication of one or more duplex processing configurations and/or one or more duplex processing configuration schedules as further described below.

As shown by reference number 620, the network node 110 may transmit, and the UE 120 may receive, an indication of a duplex processing configuration that is associated with the scheduled grant. For clarity, the example 600 shows the network node 110 transmitting the duplex processing configuration separately from the scheduled grant, as shown by reference number 610. However, some examples may include the network node 110 transmitting the duplex processing configuration with the scheduled grant. Alternatively or additionally, some examples may include the network node 110 transmitting the duplex processing configuration with an indication to activate the scheduled grant, as further described with regard to reference number 630. For example, the network node 110 may transmit, in an RRC message, one or more duplex processing configurations and then activate a particular duplex processing configuration based at least in part on DCI. To illustrate, the network node 110 may indicate the particular duplex processing configuration based at least in part on an activation DCI. Accordingly, the indication of the scheduled grant, the indication of the duplex processing configuration, and/or the indication to activate the scheduled grant may be transmitted by the network node 110 using a single transmission or multiple transmissions.

A duplex processing configuration may indicate an HD processing configuration or an FD processing configuration. In some aspects, the network node 110 may indicate the duplex processing configuration as part of a duplex processing configuration schedule. A "duplex processing configuration schedule" may denote a sequence of duplex processing configurations, such as a slot-based duplex processing configuration schedule that indicates a respective duplex processing configuration to use for processing a respective communication associated with a respective slot. To illustrate, a duplex processing configuration schedule may indicate a first duplex processing configuration associated with a first occasion of a scheduled grant (e.g., a particular occasion of the multiple occasions or a first occasion in time), a second duplex processing configuration associated with a second occasion of the scheduled grant, and a third duplex processing configuration associated with a third occasion of the scheduled grant. The first duplex processing configuration, the second duplex processing configuration, and/or the third duplex processing configuration may indicate different duplex processing configurations. The use of "first", "second", and "third" may indicate a succession of activated occasions relative to one another, where the succession of activated occasions may start within the multiple occasions at a variety of points in time. That is, the use of a "first occasion" may begin at a time that is different from when a very first occasion of the multiple occasions occurs.

In some aspects, the network node 110 may indicate a duplex processing configuration schedule based at least in part on a bitmap, and each bit of the bitmap may be associated with a respective (activated) occasion of a scheduled grant. The network node 110 may set each bit to a respective value that indicates a duplex processing configuration. For instance, a first bit value (e.g., "0") may indicate an HD processing configuration and a second bit value (e.g., "1") may indicate an FD processing configuration. To illustrate, a bitmap of [1, 0, 1] may indicate an FD processing configuration for a first occasion of the scheduled grant, an HD processing configuration for a second occasion of the scheduled grant, and an FD processing configuration for a third occasion of the scheduled grant. The "first", "second", and "third" occasions may be based at least in part on a variety of parameters, such a time-based parameter, an activation state, and/or a slot type.

As one example, each bit of the bitmap may be associated with a respective occasion of a scheduled grant that occurs at a same time duration as a particular slot type, such as an FD slot type, an HD slot type, and/or a flexible slot type that could be configured as either an FD slot or an HD slot. To illustrate, and with regard to the SBFD format 402 of FIG. 4, the first time slot associated with the time duration 406 and/or the second time duration 410 may each be classified as an HD slot based at least in part on each time slot being associated with only downlink or only uplink. The third time slot associated with the time duration 412 and the fourth time slot associated with the time duration 414 may be classified as FD slots based at least in part on each time slot including a downlink sub-band and an uplink sub-band. A "flexible slot" (not shown in FIG. 4) may denote a time slot that may change between FD and HD as the slot format repeats. For example, as the SBFD format 402 repeats in time, each time slot retains the specified FD or HD configuration. A "flexible slot" may change from one instance to a next as a format pattern repeats. In some aspects, the network node 110 may indicate to apply a duplex processing configuration to a flexible slot. For example, a bitmap of [1, 0, 1] may indicate to use an FD processing configuration for a first (activated) occasion of the scheduled grant that occurs in a first flexible slot, an HD processing configuration for a second (activated) occasion of the scheduled grant that occurs in a second flexible slot, and an FD processing configuration for a third (activated) occasion of the scheduled grant that occurs in a third flexible slot. In some aspects, occasions sequential in time may each occur on a flexible slot, while in other aspects occasions non-sequential in time may occur during flexible slots (e.g., a first occasion in time occurs during a flexible slot, a second occasion in time occurs during a non-flexible slot, and/or a third occasion in time occurs during a flexible slot).

A network node 110 may implicitly indicate to apply an FD processing configuration to FD slots (e.g., the time duration 412 and/or the time duration 414), an HD processing configuration to HD slots (e.g., the time duration 406 and/or the time duration 410), and to apply the indicated duplex processing configuration to flexible slots. Alternatively or additionally, the network node 110 may explicitly indicate to apply the indicated duplex processing configuration to flexible slots, such as through an RRC message and/or DCI. The indicated duplex processing configuration that is associated with only flexible slots may be based at least in part on a single duplex processing configuration, a bitmap as further described above, and/or an entry in an RRC configured table as further described below.

In some aspects, the bitmap may include a number of bits that is equal to a total number of occasions associated with the scheduled grant (e.g., the total number of the multiple occasions). In other aspects, the bitmap may be associated with a subset of occasions. Based at least in part on the bitmap being associated with a subset of occasions, the network node 110 may indicate to repeat applying the duplex processing configurations indicated by the bitmap to communications associated with other subsets of (activated) occasions. That is, the network node 110 may indicate to repeat applying a pattern of duplex processing configurations as indicated by the bitmap. As one example, the network node 110 may indicate to repeat using the pattern associated with the bitmap until the scheduled grant is deactivated.

In some aspects, the network node 110 may indicate multiple duplex processing configuration sequences (e.g., in RRC messaging). As one example, the network node 110 may indicate an RRC configured table of duplex processing configuration sequences. Each index of the RRC configured table may map to a different duplex processing configuration sequence. The network node 110 may select a particular duplex processing configuration sequence from the RRC configured table based at least in part on indicating an index (e.g., in DCI) that maps to the particular duplex processing configuration sequence.

As shown by reference number 630, the network node 110 may transmit, and the UE 120 may receive, an indication to activate the scheduled grant. As one example, the network node may indicate to activate the scheduled grant based at least in part on an activation DCI. In some aspects, the activation DCI includes a duplex processing configuration field that may indicate a particular and/or selected duplex processing configuration to use for processing a communication that is based at least in part on an occasion of a scheduled grant. Alternatively or additionally, the duplex processing configuration field may indicate a particular and/or selected duplex processing configuration sequence of multiple duplex processing configuration sequences. For instance, the activation DCI, by way of the duplex processing configuration field, may indicate an index that maps to an entry of the RRC configured table. The duplex processing configuration field may be a single bit or multiple bits.

As shown by reference number 640, the network node 110 and the UE 120 may communicate based at least in part on the scheduled grant and the duplex processing configuration. As one example, the UE may apply a full band filter for processing an uplink and/or a downlink transmission based at least in part on the duplex processing configuration indicating an HD processing configuration. In some aspects, the UE may apply the full band filter independently of whether the associated occasion occurs in an HD slot or an FD slot. To illustrate, and with regard to the SBFD format 402, the network node 110 may indicate an HD processing configuration for an occasion that occurs during the time duration 412 (e.g., an FD slot) based at least in part on a lack of scheduled downlink transmissions during the time duration 412. As another example, the UE 120 may refrain from using an in-band filter designed to remove an in-band signal and/or may use a full-band filter with less strict requirements relative to the in-band filter. By the network node 110 indicating an HD processing configuration for the time duration 412, the UE 120 may use a full band filter (e.g., a full band as defined by the slot format) and conserve energy and/or processing power relative to using a filter with a narrower band (e.g., a sub-band as defined by the slot format) and/or in-band filter relative to the full band.

While the example 600 describes aspects of the network node 110 indicating a duplex processing configuration, and the UE 120 processing a communication based at least in part on the duplex processing configuration indicated by the network node, other examples may include the UE 120 determining a duplex processing configuration for a communication associated with an occasion of SPS (e.g., without receiving an indication of the duplex processing configuration from the network node 110). As one example, the UE may perform blind detection of a duplex transmission type associated with a communication and process the communication based at least in part on the duplex processing configuration determined by the UE. To illustrate, the UE may detect a presence of power (and/or lack of power) in one or more sub-bands, such as a DL sub-band and/or an UL sub-band, to determine the duplex transmission type.

In some aspects, the network node 110 and the UE 120 may iteratively communicate based at least in part on the scheduled grant and the duplex processing configuration as shown by reference number 650. As one example, the network node 110 may transmit, and the UE 120 may receive, one or more downlink communications based at least in part on one or more SPS occasions. As another example, the UE 120 may transmit, and the network node 110 may receive, one or more uplink communications based at least in part on one or more CG occasions. The UE 120 may process one or more uplink and/or downlink communications based at least in part on a duplex processing configuration and/or a duplex processing configuration schedule. Alternatively or additionally, the UE 120 may process a communication based at least in part on a slot type associated with an occasion of the scheduled grant, such as a flexible slot type, an FD slot type, and/or an HD slot type. In some aspects, the UE 120 may process a communication based at least in part on repeatedly using a pattern indicated by a single duplex processing configuration, a bitmap, and/or a table entry.

As shown by reference number 660, the network node 110 may transmit, and the UE 120 may receive, an indication to reactivate the scheduled grant with a different duplex processing configuration. Alternatively or additionally, the network node 110 may transmit a retransmission request that indicates the different duplex processing configuration. For instance, the network node 110 may initially indicate a first duplex processing configuration and/or a first duplex processing configuration schedule based at least in part on initially activating a scheduled grant. In some aspects, and as shown by reference number 660, the network node 110 may reactivate the scheduled grant based at least in part on a second duplex processing configuration and/or a second duplex processing configuration schedule that is different from the first. Alternatively or additionally, the network node 110 may reconfigure the duplex processing configuration used by the UE 120 based at least in part on a retransmission request (e.g., a HARQ retransmission request). Accordingly, the UE 120 may process a communication that occurs in an occasion of the scheduled grant, after reactivation, based at least in part on the second duplex processing configuration and/or the second duplex processing configuration schedule.

As shown by reference number 670, the network node 110 may transmit, and the UE 120 may receive, an indication to deactivate the scheduled grant. To illustrate, the network node 110 may transmit the indication to deactivate the scheduled grant based at least in part on DCI. Accordingly, the UE 120 may cease processing communications associated with one or more occasions of the scheduled grant. Ceasing to process the communications may include ceasing to use a pattern indicated by a single duplex processing configuration, a bitmap, and/or a table entry.

A network node indicating a duplex processing configuration to a UE may enable the UE to process a communication that is based at least in part on a mismatched duplex configuration and slot duplex configuration (e.g., a communication associated with an occasion of a scheduled grant). By processing the communication, instead of refraining from using the associated air interface resources and waiting for an aligned duplex configuration and slot duplex configuration, the UE may decrease data transfer latencies and improve data throughput. In some aspects, and based at least in part on the duplex processing configuration, the UE may process the communication based at least in part on using a processing configuration (e.g., a filter bandwidth) that reduces energy consumption and/or processing power at the UE relative to other processing configurations.

As indicated above, FIG. 6 is provided as an example. Other examples may differ from what is described with regard to FIG. 6.

Figure 7:
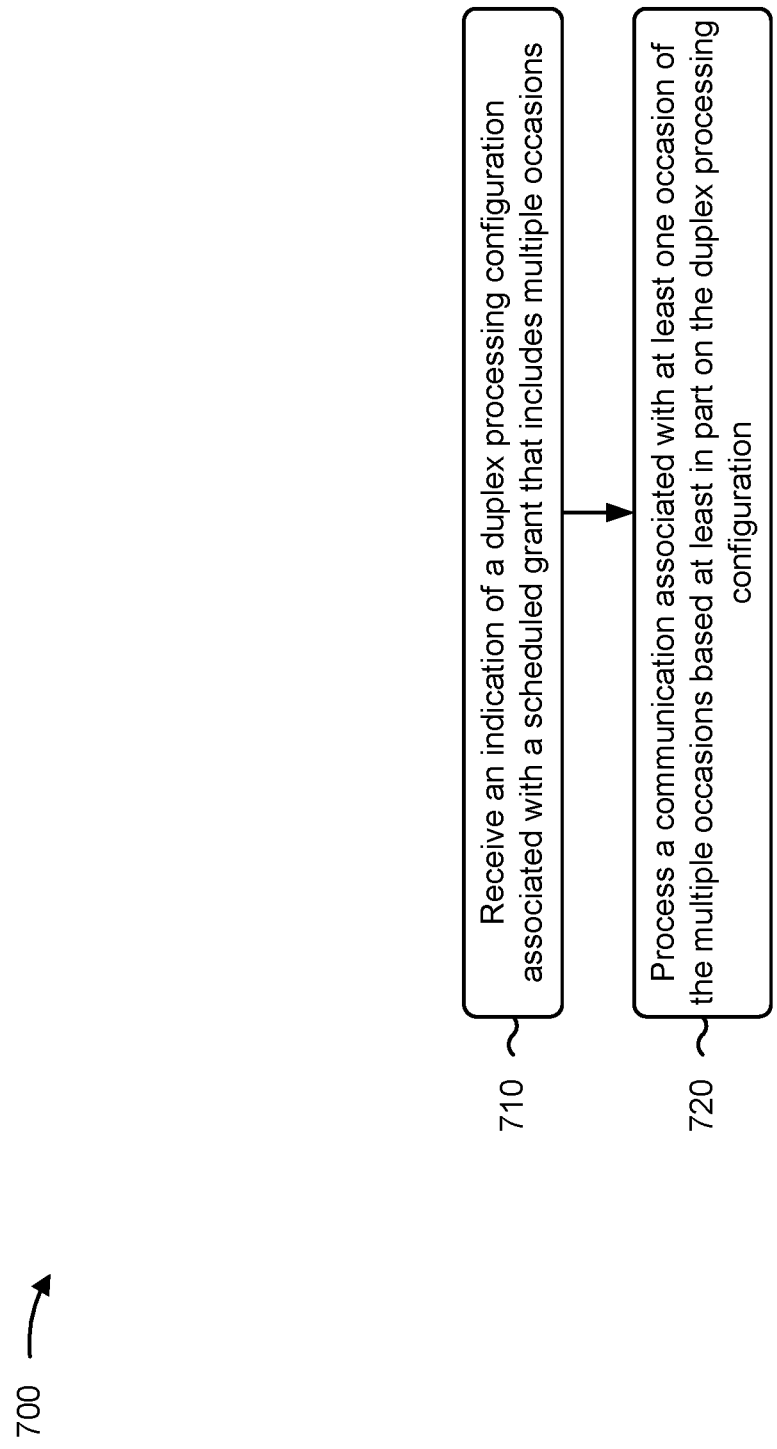
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with SPS and CG activation using a duplexing parameter.

As shown in FIG. 7, in some aspects, process 700 may include receiving an indication of a duplex processing configuration associated with a scheduled grant that includes multiple occasions (block 710). For example, the UE (e.g., using communication manager 140 and/or reception component 1002, depicted in FIG. 10) may receive an indication of a duplex processing configuration associated with a scheduled grant that includes multiple occasions, as described above.

As further shown in FIG. 7, in some aspects, process 700 may include processing a communication associated with at least one occasion of the multiple occasions based at least in part on the duplex processing configuration (block 720). For example, the UE (e.g., using communication manager 140 and/or a duplex processing manager component 1008, depicted in FIG. 10) may process a communication associated with at least one occasion of the multiple occasions based at least in part on the duplex processing configuration, as described above.

Process 700 may include additional aspects, such as any single aspect or any combination of aspects described below and/or in connection with one or more other processes described elsewhere herein.

In a first aspect, the scheduled grant is a CG, and processing the communication includes processing an uplink communication for transmission based at least in part on the CG.

In a second aspect, alone or in combination with the first aspect, the scheduled grant is SPS, and processing the communication includes processing a downlink communication received based at least in part on the SPS.

In a third aspect, alone or in combination with one or more of the first and second aspects, the duplex processing configuration includes at least one of an HD processing configuration, or an FD processing configuration.

In a fourth aspect, alone or in combination with one or more of the first through third aspects, the FD processing configuration includes at least one uplink sub-band in a time slot, and at least one downlink sub-band in the time slot.

In a fifth aspect, alone or in combination with one or more of the first through fourth aspects, receiving the indication of the duplex processing configuration includes receiving the indication of the duplex processing configuration based at least in part on activation DCI.

In a sixth aspect, alone or in combination with one or more of the first through fifth aspects, the activation DCI includes a duplex processing configuration field.

In a seventh aspect, alone or in combination with one or more of the first through sixth aspects, the duplex processing configuration field is a single bit.

In an eighth aspect, alone or in combination with one or more of the first through seventh aspects, process 700 includes receiving, prior to receiving the activation DCI, a plurality of duplex processing configuration sequences, and the activation DCI indicates a selected duplex processing configuration sequence of the plurality of duplex processing configuration sequences.

In a ninth aspect, alone or in combination with one or more of the first through eighth aspects, the plurality of duplex processing configuration sequences includes a table of duplex processing configuration sequences, and the activation DCI indicates an index that maps to an entry of the table associated with the selected duplex processing configuration sequence.

In a tenth aspect, alone or in combination with one or more of the first through ninth aspects, receiving the plurality of duplex processing configuration sequences includes receiving the plurality of duplex processing configuration sequences based at least in part on an RRC message.

In an eleventh aspect, alone or in combination with one or more of the first through tenth aspects, the duplex processing configuration is a first duplex processing configuration, the indication of the duplex processing configuration is a first indication, the communication is a first communication, and process 700 includes receiving a second indication of a second duplex processing configuration, the second duplex processing configuration is different from the first duplex processing configuration, and processing a second communication associated with at least a second occasion of the scheduled grant is based at least in part on the duplex processing configuration.

In a twelfth aspect, alone or in combination with one or more of the first through eleventh aspects, receiving the indication of the second duplex processing configuration further includes receiving the indication in reactivation downlink control information, or receiving the indication in a retransmission request.

In a thirteenth aspect, alone or in combination with one or more of the first through twelfth aspects, processing the communication further includes processing the communication based at least in part on a slot type associated with the at least one occasion of the multiple occasions.

In a fourteenth aspect, alone or in combination with one or more of the first through thirteenth aspects, the duplex processing configuration is a first duplex processing configuration, and receiving the duplex processing configuration includes receiving a duplex processing configuration schedule that indicates a respective duplex processing configuration for one or more occasions of the multiple occasions. In some aspects, the duplex processing configuration schedule includes the first duplex processing configuration.

In a fifteenth aspect, alone or in combination with one or more of the first through fourteenth aspects, the duplex processing configuration schedule is based at least in part on a bitmap, and each bit of the bitmap is associated with a respective occasion of the multiple occasions.

In a sixteenth aspect, alone or in combination with one or more of the first through fifteenth aspects, the bitmap includes a first number of bits that is equal to a total number of occasions in the multiple occasions.

In a seventeenth aspect, alone or in combination with one or more of the first through sixteenth aspects, the bitmap includes a number of bits that is based at least in part on a subset of occasions in the multiple occasions.

In an eighteenth aspect, alone or in combination with one or more of the first through seventeenth aspects, process 700 includes repeatedly using a pattern indicated by the bitmap to process one or more communications associated with the multiple occasions.

In a nineteenth aspect, alone or in combination with one or more of the first through eighteenth aspects, process 700 includes receiving deactivation downlink control information associated with the scheduled grant, and ceasing to use the pattern indicated by the bitmap.

In a twentieth aspect, alone or in combination with one or more of the first through nineteenth aspects, each bit in the bitmap is associated with a respective flexible slot.

In a twenty-first aspect, alone or in combination with one or more of the first through twentieth aspects, receiving the indication of the duplex processing configuration includes receiving the indication of the duplex processing configuration based at least in part on an RRC message.

In a twenty-second aspect, alone or in combination with one or more of the first through twenty-first aspects, the duplex processing configuration is associated with any flexible slot associated with an activated occasion of the scheduled grant.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
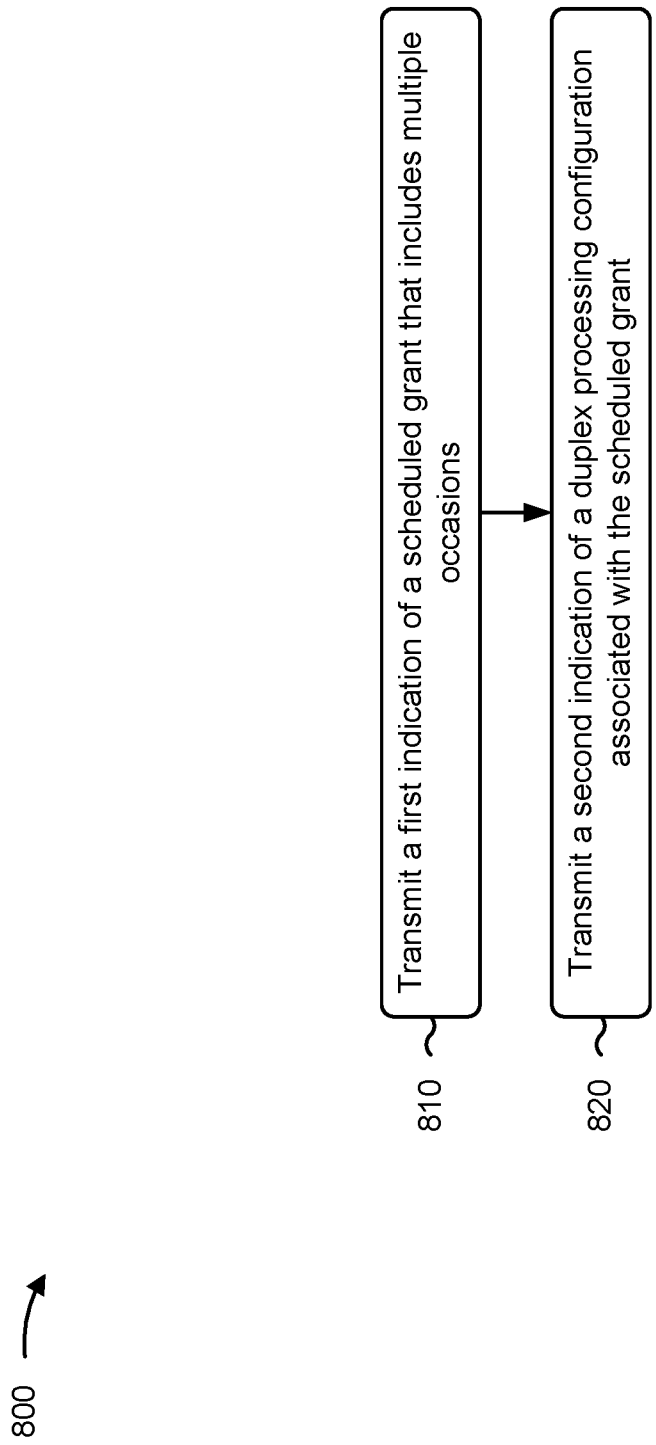
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110 performs operations associated with SPS scheduling and CG activation using a duplexing parameter.

As shown in FIG. 8, in some aspects, process 800 may include transmitting a first indication of a scheduled grant that includes multiple occasions (block 810). For example, the network node (e.g., using communication manager 150 and/or transmission component 1104, depicted in FIG. 11) may transmit a first indication of a scheduled grant that includes multiple occasions, as described above.

As further shown in FIG. 8, in some aspects, process 800 may include transmitting a second indication of a duplex processing configuration associated with the scheduled grant (block 820). For example, the network node (e.g., using communication manager 150 and/or transmission component 1104, depicted in FIG. 11) may transmit a second indication of a duplex processing configuration associated with the scheduled grant, as described above.

Process 800 may include additional aspects, such as any single aspect or any combination of aspects described below and/or in connection with one or more other processes described elsewhere herein.

In a first aspect, the scheduled grant includes a CG.

In a second aspect, alone or in combination with the first aspect, the scheduled grant includes SPS.

In a third aspect, alone or in combination with one or more of the first and second aspects, the duplex processing configuration includes at least one of an HD processing configuration, or an FD processing configuration.

In a fourth aspect, alone or in combination with one or more of the first through third aspects, the full-duplex processing configuration includes at least one uplink sub-band in a time slot, and at least one downlink sub-band in the time slot. In a fifth aspect, alone or in combination with one or more of the first through fourth aspects, transmitting the second indication of the duplex processing configuration includes transmitting the second indication of the duplex processing configuration based at least in part on activation DCI.

In a sixth aspect, alone or in combination with one or more of the first through fifth aspects, the activation DCI includes a duplex processing configuration field.

In a seventh aspect, alone or in combination with one or more of the first through sixth aspects, the duplex processing configuration field is a single bit.

In an eighth aspect, alone or in combination with one or more of the first through seventh aspects, process 800 includes transmitting, prior to transmitting the activation DCI, a plurality of duplex processing configuration sequences, and the activation DCI indicates a selected duplex processing configuration sequence of the plurality of duplex processing configuration sequences.

In a ninth aspect, alone or in combination with one or more of the first through eighth aspects, the plurality of duplex processing configuration sequences includes a table of duplex processing configuration sequences, and the activation DCI indicates an index that maps to an entry of the table associated with the selected duplex processing configuration sequence.

In a tenth aspect, alone or in combination with one or more of the first through ninth aspects, transmitting the plurality of duplex processing configuration sequences includes transmitting the plurality of duplex processing configuration sequences based at least in part on an RRC message.

In an eleventh aspect, alone or in combination with one or more of the first through tenth aspects, the duplex processing configuration is a first duplex processing configuration, process 800 includes transmitting a third indication of a second duplex processing configuration, and the second duplex processing configuration is different from the first duplex processing configuration.

In a twelfth aspect, alone or in combination with one or more of the first through eleventh aspects, transmitting the third indication of the second duplex processing configuration further includes transmitting the third indication in reactivation downlink control information, or transmitting the third indication in a retransmission request.

In a thirteenth aspect, alone or in combination with one or more of the first through twelfth aspects, process 800 includes indicating a slot type associated with using the duplex processing configuration.

In a fourteenth aspect, alone or in combination with one or more of the first through thirteenth aspects, the duplex processing configuration is a first duplex processing configuration, and transmitting the duplex processing configuration includes transmitting a duplex processing configuration schedule that indicates a respective duplex processing configuration for one or more occasions of the multiple occasions. In some aspects, the duplex processing configuration schedule includes the first duplex processing configuration.

In a fifteenth aspect, alone or in combination with one or more of the first through fourteenth aspects, the duplex processing configuration schedule is based at least in part on a bitmap, and each bit of the bitmap is associated with a respective occasion of the multiple occasions.

In a sixteenth aspect, alone or in combination with one or more of the first through fifteenth aspects, the bitmap includes a first number of bits that is equal to a total number of occasions in the multiple occasions.

In a seventeenth aspect, alone or in combination with one or more of the first through sixteenth aspects, the bitmap includes a number of bits that is based at least in part on a subset of occasions in the multiple occasions.

In an eighteenth aspect, alone or in combination with one or more of the first through seventeenth aspects, each bit in the bitmap is associated with a respective flexible slot.

In a nineteenth aspect, alone or in combination with one or more of the first through eighteenth aspects, transmitting the second indication of the duplex processing configuration includes transmitting the second indication of the duplex processing configuration based at least in part on an RRC message.

In a twentieth aspect, alone or in combination with one or more of the first through nineteenth aspects, the duplex processing configuration is associated with any flexible slot associated with an activated occasion of the scheduled grant.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
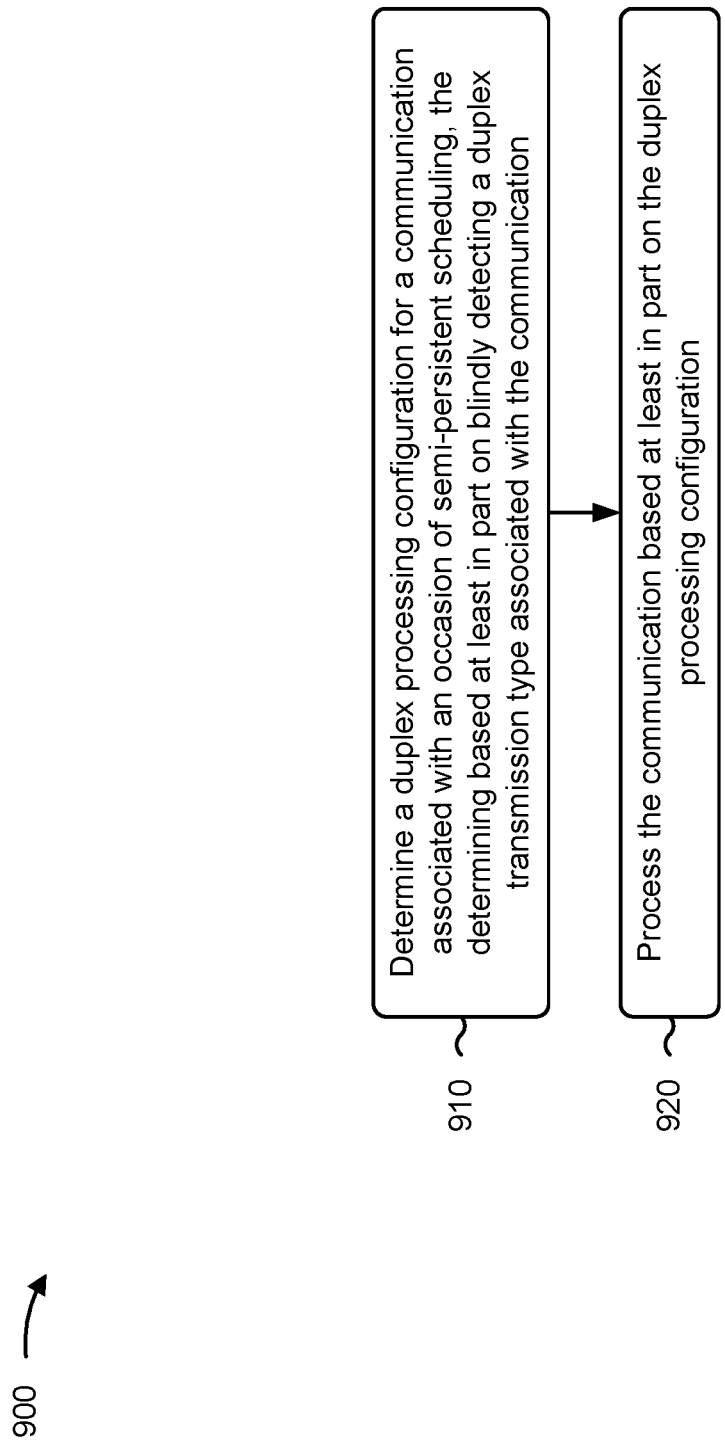
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with SPS and CG activation using a duplexing parameter.

As shown in FIG. 9, in some aspects, process 900 may include determining a duplex processing configuration for a communication associated with an occasion of SPS, the determining based at least in part on blindly detecting a duplex transmission type associated with the communication (block 910). For example, the UE (e.g., using communication manager 140 and/or duplex processing manager component 1008, depicted in FIG. 10) may determine a duplex processing configuration for a communication associated with an occasion of SPS, the determining being based at least in part on blindly detecting a duplex transmission type associated with the communication, as described above.

As further shown in FIG. 9, in some aspects, process 900 may include processing the communication based at least in part on the duplex processing configuration (block 920). For example, the UE (e.g., using communication manager 140 and/or duplex processing manager component 1008, depicted in FIG. 10) may process the communication based at least in part on the duplex processing configuration, as described above.

Process 900 may include additional aspects, such as any single aspect or any combination of aspects described below and/or in connection with one or more other processes described elsewhere herein.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
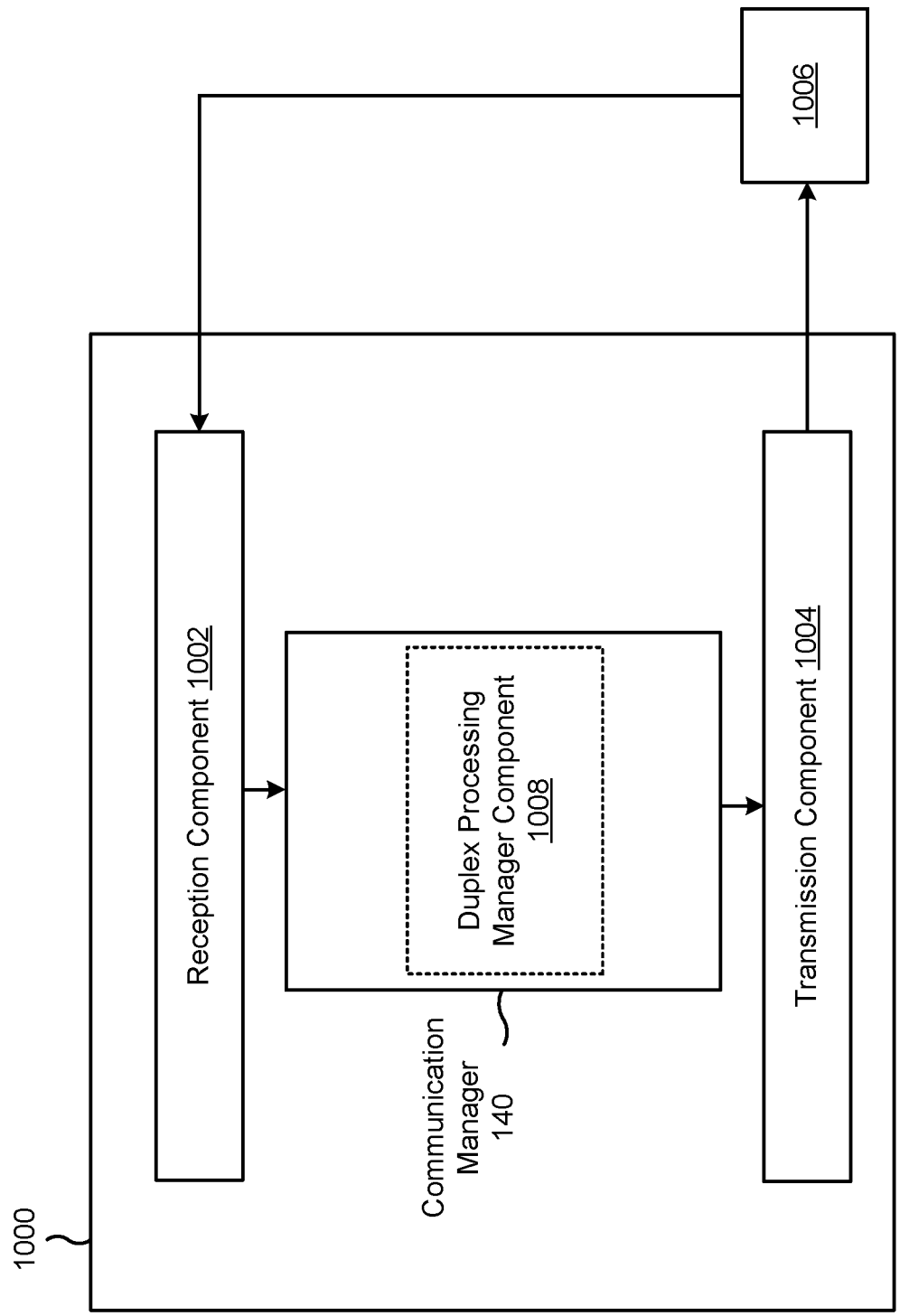
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a duplex processing manager component 1008, among other examples.

In some aspects, the apparatus 1000 may be configured to perform one or more operations described herein in connection with FIGS. 6-9. Additionally, or alternatively, the apparatus 1000 may be configured to perform one or more processes described herein, such as process 700 of FIG. 7, process 900 of FIG. 9, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The duplex processing manager component 1008 may receive, by way of the reception component 1002, an indication of a duplex processing configuration associated with a scheduled grant that includes multiple occasions. The duplex processing manager component 1008 may process a communication associated with at least one occasion of the multiple occasions based at least in part on the duplex processing configuration.

The duplex processing manager component 1008 may receive, by way of the reception component 1002 and prior to receiving the activation DCI, a plurality of duplex processing configuration sequences. In some aspect, the duplex processing manager component 1008 may receive, by way of the reception component 1002, deactivation DCI associated with the scheduled grant. Based at least in part on receiving the deactivation DCI, the duplex processing manager component 1008 may cease to use the pattern indicated by the bitmap.

In some aspects, the duplex processing manager component 1008 may determine a duplex processing configuration for a communication associated with an occasion of SPS, the determining based at least in part on blindly detecting a duplex transmission type associated with the communication. The duplex processing manager component 1008 may process the communication based at least in part on the duplex processing configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
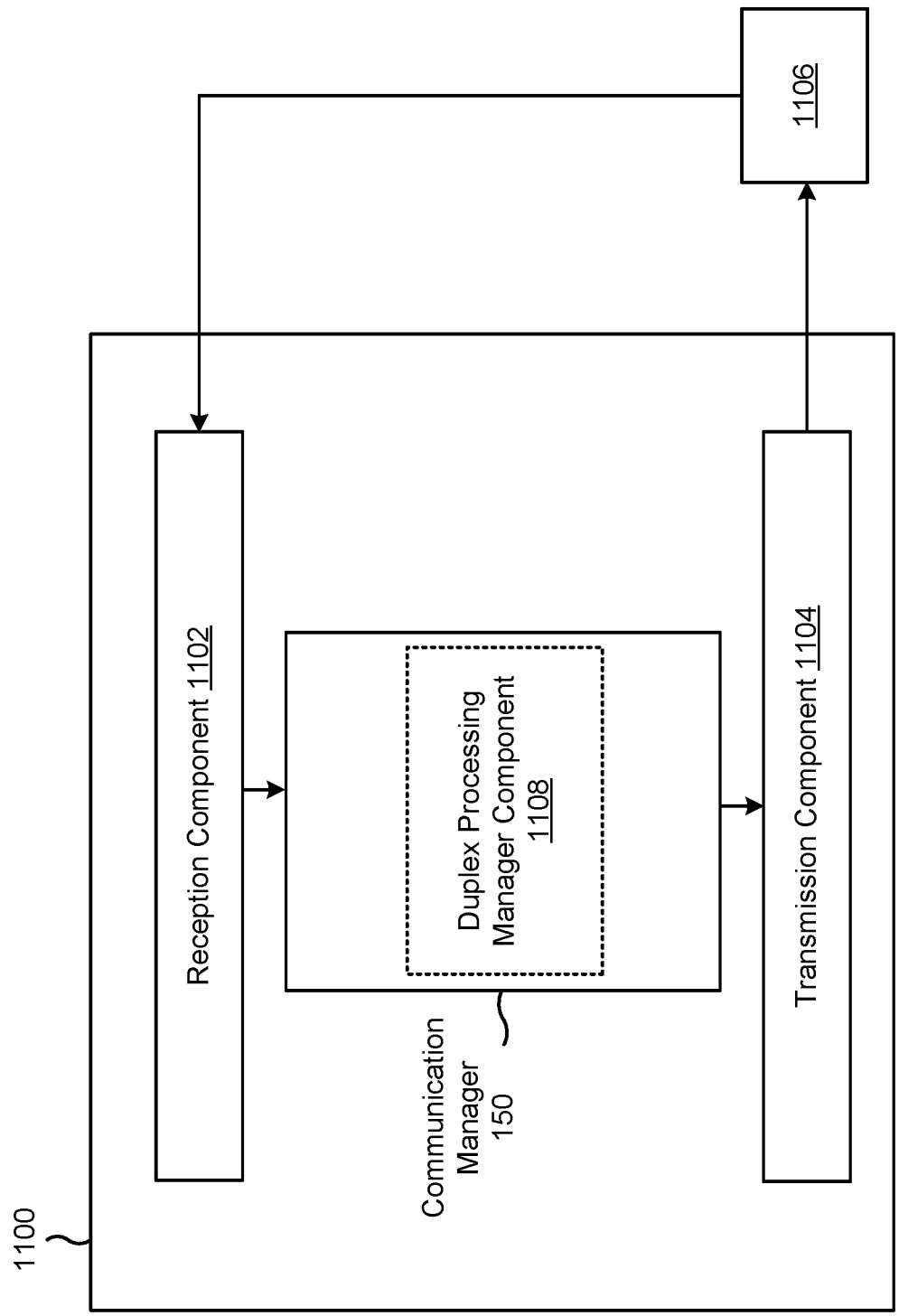
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include one or more of a duplex processing manager component 1108, among other examples.

In some aspects, the apparatus 1100 may be configured to perform one or more operations described herein in connection with FIGS. 6-9. Additionally, or alternatively, the apparatus 1100 may be configured to perform one or more processes described herein, such as process 800 of FIG. 8, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit a first indication of a scheduled grant that includes multiple occasions. The transmission component 1104 may transmit a second indication of a duplex processing configuration associated with the scheduled grant.

The duplex processing manager component 1108 may transmit, by way of the transmission component 1104 and prior to transmitting the activation DCI, a plurality of duplex processing configuration sequences. Alternatively or additionally, the duplex processing manager component 1108 may transmit an indication of a duplex processing configuration. In some aspects, the duplex processing manager component 1108 may indicate a slot type associated with using the duplex processing configuration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving an indication of a duplex processing configuration associated with a scheduled grant that includes multiple occasions; and processing a communication associated with at least one occasion of the multiple occasions based at least in part on the duplex processing configuration.

Aspect 2: The method of Aspect 1, wherein the scheduled grant comprises a configured grant, and wherein processing the communication comprises: processing an uplink communication for transmission based at least in part on the configured grant.

Aspect 3: The method of Aspect 1 or Aspect 2, wherein the scheduled grant comprises semi-persistent scheduling, and wherein processing the communication comprises: processing a downlink communication received based at least in part on the semi-persistent scheduling.

Aspect 4: The method of any one of Aspects 1-3, wherein the duplex processing configuration comprises at least one of: a half-duplex processing configuration, or a full-duplex processing configuration.

Aspect 5: The method of Aspect 4, wherein the full-duplex processing configuration comprises: at least one uplink sub-band in a time slot, and at least one downlink sub-band in the time slot.

Aspect 6: The method of any one of Aspects 1-5, wherein receiving the indication of the duplex processing configuration comprises: receiving the indication of the duplex processing configuration based at least in part on activation downlink control information (DCI).

Aspect 7: The method of Aspect 6, wherein the activation DCI includes a duplex processing configuration field.

Aspect 8: The method of Aspect 7, wherein the duplex processing configuration field is a single bit.

Aspect 9: The method of Aspect 6 or Aspect 7, further comprising: receiving, prior to receiving the activation DCI, a plurality of duplex processing configuration sequences, and wherein the activation DCI indicates a selected duplex processing configuration sequence of the plurality of duplex processing configuration sequences. wherein the activation DCI indicates a selected duplex processing configuration sequence of the plurality of duplex processing configuration sequences.

Aspect 10: The method of Aspect 9, wherein the plurality of duplex processing configuration sequences comprises a table of duplex processing configuration sequences, and wherein the activation DCI indicates an index that maps to an entry of the table associated with the selected duplex processing configuration sequence.

Aspect 11: The method of Aspect 9 or Aspect 10, wherein receiving the plurality of duplex processing configuration sequences comprises: receiving the plurality of duplex processing configuration sequences based at least in part on a radio resource control message.

Aspect 12: The method of any one of Aspects 1-11, wherein the duplex processing configuration is a first duplex processing configuration, the indication of the duplex processing configuration is a first indication, the communication is a first communication, and the method further comprises: receiving a second indication of a second duplex processing configuration, wherein the second duplex processing configuration is different from the first duplex processing configuration; and processing a second communication associated with at least a second occasion of the scheduled grant based at least in part on the duplex processing configuration.

Aspect 13: The method of Aspect 12, wherein receiving the indication of the second duplex processing configuration further comprises: receiving the indication in reactivation downlink control information; or receiving the indication in a retransmission request.

Aspect 14: The method of any one of Aspects 1-13, wherein processing the communication further comprises: processing the communication based at least in part on a slot type associated with the at least one occasion of the multiple occasions.

Aspect 15: The method of any one of Aspects 1-14, wherein the duplex processing configuration is a first duplex processing configuration, and wherein receiving the duplex processing configuration comprises: receiving a duplex processing configuration schedule that indicates a respective duplex processing configuration for one or more occasions of the multiple occasions, wherein the duplex processing configuration schedule includes the first duplex processing configuration.

Aspect 16: The method of Aspect 15, wherein the duplex processing configuration schedule is based at least in part on a bitmap, and wherein each bit of the bitmap is associated with a respective occasion of the multiple occasions.

Aspect 17: The method of Aspect 16, wherein the bitmap includes a first number of bits that is equal to a total number of occasions in the multiple occasions.

Aspect 18: The method of Aspect 16, wherein the bitmap includes a number of bits that is based at least in part on a subset of occasions in the multiple occasions.

Aspect 19: The method of Aspect 18, wherein the method further comprises: repeatedly using a pattern indicated by the bitmap to process one or more communications associated with the multiple occasions.

Aspect 20: The method of Aspect 19, further comprising: receiving deactivation downlink control information associated with the scheduled grant; and ceasing to use the pattern indicated by the bitmap.

Aspect 21: The method of any one of Aspects 16-20, wherein each bit in the bitmap is associated with a respective flexible slot.

Aspect 22: The method of any one of Aspects 1-21, wherein receiving the indication of the duplex processing configuration comprises: receiving the indication of the duplex processing configuration based at least in part on a radio resource control message.

Aspect 23: The method of Aspect 22, wherein the duplex processing configuration is associated with any flexible slot associated with an activated occasion of the scheduled grant.

Aspect 24: A method of wireless communication performed by a network node, comprising: transmitting a first indication of a scheduled grant that includes multiple occasions; and transmitting a second indication of a duplex processing configuration associated with the scheduled grant.

Aspect 25: The method of Aspect 24, wherein the scheduled grant comprises a configured grant.

Aspect 26: The method of Aspect 25, wherein the scheduled grant comprises semi-persistent scheduling.

Aspect 27: The method of any one of Aspects 24-26, wherein the duplex processing configuration comprises at least one of: a half-duplex processing configuration, or a full-duplex processing configuration.

Aspect 28: The method of Aspect 27, wherein the full-duplex processing configuration comprises: at least one uplink sub-band in a time slot, and at least one downlink sub-band in the time slot.

Aspect 29: The method of any one of Aspects 24-28, wherein transmitting the second indication of the duplex processing configuration comprises: transmitting the second indication of the duplex processing configuration based at least in part on activation downlink control information (DCI).

Aspect 30: The method of Aspect 29, wherein the activation DCI includes a duplex processing configuration field.

Aspect 31: The method of Aspect 30, wherein the duplex processing configuration field is a single bit.

Aspect 32: The method of any one of Aspects 29-31, further comprising: transmitting, prior to transmitting the activation DCI, a plurality of duplex processing configuration sequences, and wherein the activation DCI indicates a selected duplex processing configuration sequence of the plurality of duplex processing configuration sequences.

Aspect 33: The method of Aspect 32, wherein the plurality of duplex processing configuration sequences comprises a table of duplex processing configuration sequences, and wherein the activation DCI indicates an index that maps to an entry of the table associated with the selected duplex processing configuration sequence.

Aspect 34: The method of Aspect 32 or Aspect 33, wherein transmitting the plurality of duplex processing configuration sequences comprises: transmitting the plurality of duplex processing configuration sequences based at least in part on a radio resource control message.

Aspect 35: The method of any one of Aspects 24-34, wherein the duplex processing configuration is a first duplex processing configuration, and the method further comprises: transmitting a third indication of a second duplex processing configuration, wherein the second duplex processing configuration is different from the first duplex processing configuration.

Aspect 36: The method of Aspect 35, wherein transmitting the third indication of the second duplex processing configuration further comprises: transmitting the third indication in reactivation downlink control information; or transmitting the third indication in a retransmission request.

Aspect 37: The method of any one of Aspects 24-36, further comprising: indicating a slot type associated with using the duplex processing configuration.

Aspect 38: The method of any one of Aspects 24-37, wherein the duplex processing configuration is a first duplex processing configuration, and wherein transmitting the duplex processing configuration comprises: transmitting a duplex processing configuration schedule that indicates a respective duplex processing configuration for one or more occasions of the multiple occasions, wherein the duplex processing configuration schedule includes the first duplex processing configuration.

Aspect 39: The method of Aspect 38, wherein the duplex processing configuration schedule is based at least in part on a bitmap, and wherein each bit of the bitmap is associated with a respective occasion of the multiple occasions.

Aspect 40: The method of Aspect 39, wherein the bitmap includes a first number of bits that is equal to a total number of occasions in the multiple occasions.

Aspect 41: The method of Aspect 39, wherein the bitmap includes a number of bits that is based at least in part on a subset of occasions in the multiple occasions.

Aspect 42: The method of any one of Aspects 39-41, wherein each bit in the bitmap is associated with a respective flexible slot.

Aspect 43: The method of any one of Aspects 24-42, wherein transmitting the second indication of the duplex processing configuration comprises: transmitting the second indication of the duplex processing configuration based at least in part on a radio resource control message.

Aspect 44: The method of Aspect 43, wherein the duplex processing configuration is associated with any flexible slot associated with an activated occasion of the scheduled grant.

Aspect 45: A method of wireless communication performed by a user equipment (UE), comprising: determining a duplex processing configuration for a communication associated with an occasion of semi-persistent scheduling, the determining based at least in part on blindly detecting a duplex transmission type associated with the communication; and processing the communication based at least in part on the duplex processing configuration.

Aspect 46: An apparatus for wireless communication at a device, comprising a processor; memory coupled with the processor; and instructions stored in the memory and executable by the processor to cause the apparatus to perform the method of one or more of Aspects 1-23 and 45.

Aspect 47: An apparatus for wireless communication at a device, comprising a processor; memory coupled with the processor; and instructions stored in the memory and executable by the processor to cause the apparatus to perform the method of one or more of Aspects 24-44.

Aspect 48: A device for wireless communication, comprising a memory and one or more processors coupled to the memory, the one or more processors configured to perform the method of one or more of Aspects 1-23 and 45.

Aspect 49: A device for wireless communication, comprising a memory and one or more processors coupled to the memory, the one or more processors configured to perform the method of one or more of Aspects 24-44.

Aspect 50: An apparatus for wireless communication, comprising at least one means for performing the method of one or more of Aspects 1-23 and 45.

Aspect 51: An apparatus for wireless communication, comprising at least one means for performing the method of one or more of Aspects 24-44.

Aspect 52: A non-transitory computer-readable medium storing code for wireless communication, the code comprising instructions executable by a processor to perform the method of one or more of Aspects 1-23 and 45.

Aspect 53: A non-transitory computer-readable medium storing code for wireless communication, the code comprising instructions executable by a processor to perform the method of one or more of Aspects 24-44.

Aspect 54: A non-transitory computer-readable medium storing a set of instructions for wireless communication, the set of instructions comprising one or more instructions that, when executed by one or more processors of a device, cause the device to perform the method of one or more of Aspects 1-23 and 45.

Aspect 55: A non-transitory computer-readable medium storing a set of instructions for wireless communication, the set of instructions comprising one or more instructions that, when executed by one or more processors of a device, cause the device to perform the method of one or more of Aspects 24-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   memory; and
   one or more processors, coupled to the memory, configured to:
      receive, prior to receiving an activation downlink control information (DCI), a plurality of duplex processing configuration sequences;
      receive an indication of a duplex processing configuration associated with a scheduled grant that includes multiple occasions based at least in part on the activation DCI; and
      process a communication associated with at least one occasion of the multiple occasions based at least in part on the duplex processing configuration;
      wherein the activation DCI indicates a selected duplex processing configuration sequence of the plurality of duplex processing configuration sequences.

2. The apparatus of claim 1, wherein the scheduled grant comprises a configured grant, and
   wherein the one or more processors, to process the communication, are configured to:
      process an uplink communication for transmission based at least in part on the configured grant.

3. The apparatus of claim 1, wherein the scheduled grant comprises semi-persistent scheduling, and
   wherein the one or more processors, to process the communication, are configured to:
      process a downlink communication received based at least in part on the semi-persistent scheduling.

4. The apparatus of claim 1, wherein the activation DCI includes a duplex processing configuration field.

5. The apparatus of claim 1, wherein the plurality of duplex processing configuration sequences comprises a table of duplex processing configuration sequences, and
   wherein the activation DCI indicates an index that maps to an entry of the table associated with the selected duplex processing configuration sequence.

6. The apparatus of claim 1, wherein the duplex processing configuration is a first duplex processing configuration, and the one or more processors are further configured to:
   receive a second indication of a second duplex processing configuration, wherein the second duplex processing configuration is different from the first duplex processing configuration; and
   process a second communication associated with at least a second occasion of the scheduled grant based at least in part on the duplex processing configuration.

7. The apparatus of claim 1, wherein the duplex processing configuration is a first duplex processing configuration, and wherein receiving the duplex processing configuration comprises:
   receive a duplex processing configuration schedule that indicates a respective duplex processing configuration for one or more occasions of the multiple occasions, wherein the duplex processing configuration schedule includes the first duplex processing configuration.

8. The apparatus of claim 7, wherein the duplex processing configuration schedule is based at least in part on a bitmap, and
   wherein each bit of the bitmap is associated with a respective occasion of the multiple occasions.

9. The apparatus of claim 7, wherein the duplex processing configuration is associated with any flexible slot associated with an activated occasion of the scheduled grant.

10. An apparatus for wireless communication at a network node, comprising:
    memory; and
    one or more processors, coupled to the memory, configured to:
       transmit a first indication of a scheduled grant that includes multiple occasions;
       transmit a duplex processing configuration schedule, including a first duplex processing configuration, that indicates a respective duplex processing configuration for one or more occasions of the multiple occasions; and
       transmit a second indication of the first duplex processing configuration associated with the scheduled grant;
       wherein the duplex processing configuration schedule is based at least in part on a bitmap; and
       wherein each bit of the bitmap is associated with a respective occasion of the multiple occasions.

11. The apparatus of claim 10, wherein the one or more processors, to transmit the second indication of the duplex processing configuration, are configured to:
    transmit the second indication of the duplex processing configuration based at least in part on activation downlink control information (DCI).

12. The apparatus of claim 10, wherein the duplex processing configuration is a first duplex processing configuration, and the one or more processors are further configured to:
    transmit a third indication of a second duplex processing configuration, wherein the second duplex processing configuration is different from the first duplex processing configuration.

13. The apparatus of claim 12, wherein the one or more processors, to transmit the third indication of the second duplex processing configuration, are configured to:
    transmit the third indication in reactivation downlink control information; or
    transmit the third indication in a retransmission request.

14. The apparatus of claim 10, wherein the one or more processors are further configured to:
    indicate a slot type associated with using the duplex processing configuration.

15. The apparatus of claim 10, wherein each bit in the bitmap is associated with a respective flexible slot.

16. A method of wireless communication performed by a user equipment (UE), comprising:
    receiving a duplex processing configuration schedule, including a first duplex processing configuration, that indicates a respective duplex processing configuration for one or more occasions of multiple occasions;

receiving an indication of the first duplex processing configuration associated with a scheduled grant that includes at least one occasion of the multiple occasions; and processing a communication associated with the at least one occasion of the multiple occasions based at least in part on the first duplex processing configuration;

wherein the duplex processing configuration schedule is based at least in part on a bitmap; and wherein each bit of the bitmap is associated with a respective occasion of the multiple occasions.

17. The method of claim 16, wherein receiving the indication of the first duplex processing configuration comprises:

receiving the indication of the first duplex processing configuration based at least in part on activation downlink control information (DCI).

18. The method of claim 17, further comprising:

receiving, prior to receiving the activation DCI, a plurality of duplex processing configuration sequences, and wherein the activation DCI indicates a selected duplex processing configuration sequence of the plurality of duplex processing configuration sequences.

19. The method of claim 16, wherein the method further comprises:

repeatedly using a pattern indicated by the bitmap to process one or more communications associated with the multiple occasions.

20. A method of wireless communication performed by a network node, comprising:

transmitting a first indication of a scheduled grant that includes multiple occasions;

transmitting a duplex processing configuration schedule, including a first duplex processing configuration, that indicates a respective duplex processing configuration for one or more occasions of the multiple occasions; and transmitting a second indication of the first duplex processing configuration associated with the scheduled grant;

wherein the duplex processing configuration schedule is based at least in part on a bitmap; and wherein each bit of the bitmap is associated with a respective occasion of the multiple occasions.

21. The method of claim 20, wherein the method further comprises:

transmitting a third indication of a second duplex processing configuration, wherein the second duplex processing configuration is different from the first duplex processing configuration.

22. The method of claim 21, wherein transmitting the third indication of the second duplex processing configuration further comprises:

transmitting the third indication in reactivation downlink control information; or transmitting the third indication in a retransmission request.

* * * * *